United States Patent [19]

Clark, Jr.

[11] Patent Number: 4,753,981

[45] Date of Patent: Jun. 28, 1988

[54] POLYMERIZATION PROCESS

[75] Inventor: Earl Clark, Jr., Bartlesville, Okla.

[73] Assignee: Phillips Petroleum Company, Bartlesville, Okla.

[21] Appl. No.: 33,091

[22] Filed: Apr. 1, 1987

[51] Int. Cl.$^4$ ............................................. C08F 2/32
[52] U.S. Cl. ................................. 524/801; 523/337; 526/214; 526/224
[58] Field of Search ............... 523/336, 337; 524/801; 526/214, 224

[56] References Cited

U.S. PATENT DOCUMENTS

| | | | |
|---|---|---|---|
| 3,975,341 | 8/1976 | Trepasso | 526/303 |
| 4,189,552 | 2/1980 | Kuwata et al. | 526/84 |
| 4,252,706 | 2/1981 | Phillips et al. | 260/29.6 PM |
| 4,265,796 | 5/1981 | Mueller-Mall et al. | 260/29.6 R |
| 4,339,371 | 7/1982 | Robinson et al. | 524/310 |
| 4,450,261 | 5/1984 | Chiao et al. | 526/214 |
| 4,564,508 | 8/1984 | Easterly, Jr. | 524/787 |

OTHER PUBLICATIONS

R. A. Gray, "Preparation of Acrylic Oligomers for High Solids Coatings Using Hydroxy-Functional Mercaptan Chain.

*Primary Examiner*—Joseph L. Schofer
*Assistant Examiner*—Angela L. Fugo
*Attorney, Agent, or Firm*—J. D. Brown

[57] ABSTRACT

A water-in-oil emulsion polymerization process is provided for preparing water-in-oil latexes of water-soluble polymers of ethylenically unsaturated monomers. The process utilizes as a chain transfer agent a thiol having the formula $HS\text{-}Y(Z)_x$ wherein Y is a hydrocarbyl radical having 2–5 carbons and a valence of $x+1$; Z is selected from the group consisting of —OH, —CO$_2$H and —CO$_2$R wherein R is an alkyl radical of 1–3 carbon atoms; x is an integer of 1 or 2 and wherein the total number of carbon atoms per molecule of the thiol is 2–7.

17 Claims, No Drawings

POLYMERIZATION PROCESS

This invention relates generally to a polymerization process for preparing water-soluble polymers. More particularly, this invention relates to a water-in-oil emulsion polymerization process for preparing water-soluble polymers of variable molecular weight.

BACKGROUND OF THE INVENTION

Water-in-oil latexes having water-soluble polymers derived from hydrophilic vinyl monomers dispersed therein are well known in the art. Such latexes have found a wide variety of uses in various areas of technology. For example, such latexes are utilized as flocculants in the mining industry and in sewage treatment applications. These latexes also have found utility in various oil field applications such as mobility control agents in enhanced oil recovery operations such as water flooding. In many of the known applications of these water-in-oil latexes of water-soluble polymers it has been desired to achieve molecular weights of the water-soluble polymers in the range of 10,000,000 and higher, even up to as high as 25,000,000. However, other applications which are being developed need water-in-oil latexes comprising water-soluble polymers having molecular weights in a lower molecular weight range e.g. less than 10,000,000.

Conventional chain transfer agents which have been proposed for use in preparing water-soluble polymers in the form of water-in-oil latexes have not always functioned effectively to provide the reduced molecular weight polymers needed in certain applications. Thus, relatively high levels of such chain transfer agents have been required to produce the requisite reduced molecular weight water-soluble polymers in the form of the water-in-oil latexes. This result not only increases the cost in producing the water-in-oil latexes of water-soluble polymers but also has the possibility of providing emulsions having very disagreeable odors resulting from residual chain transfer agents, e.g. mercaptans, when used at the rather high levels discussed above. These facts can make the water-in-oil latexes of the water-soluble polymers unsuited for many applications.

Accordingly, it is an object of my invention to provide a polymerization process for preparing water-soluble polymers in the form of water-in-oil latexes by the utilization of low levels of certain thiols in the polymerization process. Another object of my invention is to provide water-in-oil latexes of water-soluble polymers prepared by the process described above.

Other objects will become apparent from the ensuing description and the examples provided herein.

BRIEF SUMMARY OF THE INVENTION

I have discovered that the utilization as a chain transfer agent of at least one thiol having the formula HS-Y(Z)$_x$ wherein Y is a hydrocarbyl radical, x is 1 or 2, and Z is selected from the group consisting of hydroxyl, carboxyl and alkyl carboxylate groups at a level of about 0.00007 to about 0.07 parts by weight of said thiol per 100 parts by weight of the water-in-oil emulsion polymerization admixture provides a polymerization process for the production of water-in-oil latexes comprising a water-soluble polymer of suitably reduced molecular weight.

DETAILED DESCRIPTION OF THE INVENTION

I have discovered a polymerization process comprising
(1) admixing:
  (a) at least one ethylenically unsaturated monomer,
  (b) water,
  (c) at least one organic liquid which is substantially immiscible with water,
  (d) at least one water-in-oil emulsifier,
  (e) at least one polymerization initiator and
  (f) at least one thiol having the formula HS-Y(Z)$_x$ wherein Y is a hydrocarbyl radical having 2–5 carbon atoms and a valence of x+1; Z is selected from the group consisting of —OH, —CO$_2$H and —CO$_2$R wherein R is an alkyl radical of 1–3 carbon atoms; x is an integer of 1 or 2; and wherein the total number of carbon atoms per molecule of said thiol is 2–7 to form an admixture wherein the amount of said thiol present in said admixture is about 0.00007 to about 0.07 parts by weight of said thiol per 100 parts by weight of said admixture; and
(2) subjecting said admixture to polymerization conditions to produce a water-in-oil latex comprising a water-soluble polymer of said at least one ethylenically unsaturated monomer.

It was surprising and unexpected that the use of thiols having the formula HS-Y(Z)$_x$ as defined and at the levels defined according to my invention would be so efficient as chain transfer agents in the polymerization system as defined whereas other proposed chain transfer agents such as alkanethiols (C$_9$ and C$_{12}$) and isopropyl alcohol were either substantially ineffective or much less effective in the same polymerization system.

As used herein, the term "water-in-oil emulsion" refers to a mixture comprising the components: water, at least one organic liquid substantially immiscible with water (oil phase), at least one ethylenically unsaturated monomer, at least one water-in-oil emulsifier, at least one polymerization initiator and at least one thiol chain transfer agent. Each of the above components will be more completely described and defined hereinafter. After polymerization of said at least one ethylenically unsaturated monomer to a significant extent, it is considered to be more proper usage to refer to said mixture as a "water-in-oil latex". This distinction will be used herein whenever possible.

Any ethylenically unsaturated monomer which, when polymerized alone or copolymerized with other ethylenically unsaturated monomers to produce a water-soluble polymer can be employed according to this invention. As used herein, the term "water-soluble polymer" is used to define a polymer which is soluble in water in an amount of at least 1 percent by weight. Examples of suitable ethylenically unsaturated monomers which can be employed according to this invention include acrylamide, methacrylamide, acrylic acid and its salts, methacrylic acid and its salts, maleic acid and its salts, methyl acrylate, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, styrene, acrylonitrile, 2-acrylamido-2-methylpropanesulfonic acid and its salts, 3-(methacrylamido)propyltrimethylammonium chloride, vinyl methyl ether, vinyl ethyl ether, alkali metal and ammonium salts of vinyl sulfonic acid, vinyl pyridine, N-vinyl-2-pyrrolidone, vinyl imidazole, diallyl dimethylammonium chloride and the like.

Preferred ethylenically unsaturated monomers include those which have appreciable water solubility since polymers therefrom will generally be readily soluble in water.

A group of more preferred monomers for use according to my invention include acrylic acid, acrylamide, N-vinyl-2-pyrrolidone and the sodium salt of 2-acrylamido-2-methylpropanesulfonic acid and mixtures of any two or more of this group.

The emulsifiers which can be used in my invention to provide water-in-oil emulsions can be any of those which are known in the art for use as water-in-oil emulsifiers. Generally, these emulsifiers have an HLB number of about 3 to about 9 as is taught in the art. The HLB number is defined in the publication "The Atlas HLB System", 4th printing, Atlas Chemical Industries, Inc. (1963). Mixtures of various known water-in-oil emulsifiers can be employed as desired in my invention. Examples of preferred mixtures of emulsifiers include a mixture of sorbitan monooleate (SPAN 80), polyoxyethylene (20) sorbitan trioleate (TWEEN 85) and polyoxyethylene (4) cetyl/stearyl alcohol (SIPONIC E-2). Another preferred mixture is a mixture of polyoxyethylene (5) sorbitan hexaoleate (G-1096) and mono- and diglycerides of fat forming fatty acids (ATMOS 300). Many other suitable emulsifier mixtures are disclosed in my copending application Ser. No. 939,641 filed Dec. 9, 1986 and incorporated herein by reference. The amount of water-in-oil emulsifier employed according to my invention will be about 1 to about 15 weight percent and preferably about 3 to about 10 weight percent based on the total weight of the entire polymerization admixture, i.e. water, monomers, oil phase, emulsifier, polymerization initiator, and thiol chain transfer agent.

Any suitable inert organic liquid which is substantially immiscible with water can be employed as the oil phase in preparing the water-in-oil emulsions and latexes according to this invention. It is preferred that this organic liquid, which is substantially immiscible with water, be a liquid hydrocarbon or a mixture of liquid hydrocarbons. More preferably, the oil phase will comprise liquid paraffinic or isoparaffinic hydrocarbons and mixtures of such hydrocarbons. The oil phase component according to my invention will generally be present in an amount of about 60 to about 120 parts by weight per 100 parts by weight of monomer(s) preferably about 80 to about 100 parts by weight per 100 parts by weight of monomer(s).

The water component will generally be present in an amount of about 50 to about 200 parts by weight per 100 parts by weight of monomer(s) with about 80 to about 120 parts by weight per 100 parts by weight of monomer(s) being preferred.

Any suitable polymerization initiator can be employed according to the process of my invention. Generally these suitable initiators will comprise compounds which generate free radical fragments which can initiate the polymerization of the ethylenically unsaturated monomer. Suitable types of initiators that can be employed according to this invention include azo compounds, organic peroxides, inorganic persulfates, organic hydroperoxides and the known redox systems which typically comprise an organic hydroperoxide and a transition metal activator component which may also include complexing agents as well as a reductant component. Examples of suitable polymerization initiators include 2,2'-azobisisobutyronitrile, 2,2'-azobis(2,4-dimethylvaleronitrile), 2,2'-azobis(2-amidinopropane)-hydrochloride, 2-t-butylazo-2-cyano-4-methoxy-4-methylpentane, 2,2'-azobis(2,4-dimethyl-4-methoxyvaleronitrile), benzoyl peroxide, di-t-butyl peroxide, t-butyl peroxyacetate, cumene hydroperoxide, potasium persulfate and p-menthane hydroperoxide. A particularly suitable polymerization initiator because of its effectiveness at low temperatures is p-menthane hydroperoxide activated by ferrous sulfate heptahydrate complexed with the tetrasodium salt of ethylenediamine tetra acetic acid and reduced by sodium formaldehyde sulfoxylate component. The amount of polymerization initiator employed according to my invention can vary quite widely but will generally be about 0.0001 to about 1, preferably about 0.0005 to about 0.5 parts by weight per 100 parts by weight of the total polymerization admixture.

As indicated above certain thiol chain transfer agents have been found to be surprisingly effective in providing water-in-oil latexes of water-soluble polymers of ethylenically unsaturated monomers according to my invention. Suitable thiol chain transfer agents for use according to my invention can be represented by the general formula HS-Y(Z)$_x$ wherein Y is a hydrocarbyl radical having from 2 to 5 carbon atoms and having a valence of x+1, wherein Z is selected from the group consisting of —OH, —CO$_2$H and —CO$_2$R wherein R is an alkyl radical of 1 to 3 carbon atoms and wherein said thiol has from 2 to 7 carbon atoms per molecule. The thiols which are defined by the above-mentioned formula will preferably be substantially water-soluble. The amount of thiol chain transfer agent employed according to my invention and defined according to the above-mentioned formula will be about 0.00007 to about 0.07, preferably about 0.00009 to about 0.05 parts by weight of thiol per 100 parts by weight of the total polymerization admixture. More preferably, the amount of thiol employed wil be about 0.00013 parts by weight to about 0.03 parts by weight per 100 parts by weight of the total polymerization admixture. Examples of suitable thiols for use according to the instant invention include 2-mercaptoethanol, mercaptoacetic acid, methyl 3-mercaptopropionate, 3-mercaptopropionic acid, 3-mercapto-1-propanol, 3-mercapto-1,2-propanediol, mercaptosuccinic acid, propyl mercaptoacetate, ethyl mercaptoacetate, methyl mercaptoacetate, dimethyl 2-mercaptomalonate and the like. For reasons of ready availability and outstanding effectiveness the preferred thiols include 2-mercaptoethanol, mercaptoacetic acid, and methyl 3-mercaptopropionate.

In carrying out the process of my invention it is generally convenient to add the water-in-oil emulsifier(s) to the oil phase to form a first mixture and to add the monomer(s) to water to form a second mixture. These mixtures are then combined followed by the addition of thiol modifier employed according to my invention. Finally, initiator is added and the admixture subjected to polymerization conditions including suitable agitation as needed.

The temperature employed for the polymerization according to my invention will broadly be about −20° C. to about 200° C. and preferably about −5° C. to about 100° C. The time employed for the polymerization of this invention will generally be from about 0.5 to about 72 hours and preferably from about 1 to about 24 hours.

My inventive process for preparing water-in-oil latexes comprising water-soluble polymers is particularly useful when the molecular weight of the water-soluble polymer is below about 10,000,000 and preferably below about 1,000,000. The invention as disclosed herein can be utilized to prepare water-soluble polymers in the form of water-in-oil latexes wherein the molecular weight of the polymer is as low as about 1,000. As used herein, molecular weight refers to a weight average molecular weight which can be determined according to methods which are well known in the art such as light scattering. For such molecular weight determinations it is only necessary that the polymer be recovered from the water-in-oil latex made according to the process of this invention and purified as needed prior to being subjected to the molecular weight determination procedures.

The water-in-oil latexes comprising the water-soluble polymers made according to the process of my invention find utility in applications where water-in-oil polymer latexes have previously been employed such as flocculation agents in mining operations and sewage treatment facilities. Other applications include use as viscosifying agents for aqueous systems employed in oil field operations such as cementing, secondary oil recovery operations and the like.

As is well known in the art, the water-in-oil latexes of water-soluble polymers made according to my invention can also be inverted by various methods to provide aqueous "solutions" of the water-soluble polymers at the site of application. Indeed, this is a common step in nearly all uses of water-in-oil latexes of water-soluble polymers. By way of illustration, a simple method of achieving such inversion is to simply stir or agitate the water-in-oil latex in the presence of a relatively large amount of water thereby producing an oil-in-water latex which for practical purposes is an aqueous solution of the water-soluble polymer wherein the small amount of oil phase can be ignored.

EXAMPLES

Examples are provided in an effort to assist one skilled in the art to a further understanding of my invention, and yet not be unduly limitative of the reasonable scope of my invention. The particular reactants, conditions, ratios, and the like are all intended to be illustrative of my invention and not limitative of the reasonable and suitable scope thereof.

EXAMPLE I

A series of runs was conducted for the copolymerization of a mixture of N-vinyl-2-pyrrolidone (VP), acrylamide (AM), acrylic acid (AA) and the sodium salt of 2-acrylamido-2-methylpropane sulfonic acid (NaAMPS) in a water-in-oil emulsion polymerization process. Various chain transfer agents at various levels were utilized in this series of runs. Each run was conducted at 5° C. for 18 hours. The polymerization initiator employed for each run was a redox initiator system composed of p-menthane hydroperoxide (PMHP) and activated by $FeSO_4.7H_2O$, sodium formaldehyde sulfoxylate (SFS), and ethylene diamine tetracetic acid tetrasodium salt with 4 moles of water of hydration (Questex 4SW). At the end of the polymerization period each run was terminated by charging sodium dimethyldithiocarbamate (Thiostop N) to the mixture. The recipe employed in this series of runs is shown below.

| RECIPE | |
|---|---|
| | Parts, by Weight |
| VP | 30 |
| AM[a] | 10 |
| AA | 5 |
| NaAMPS[a] | 55 |
| Water | 85 |
| Hydrocarbon[b] | 80 |
| Emulsifier: | |
| Span 80[c] | 9 |
| Tween 85[d] | 11 |
| Siponic E-2[e] | 12 |
| Initiator System: | |
| PMHP | 0.048 |
| $FeSO_4.7H_2O$ | 0.00004 |
| Questex 4SW | 0.00012 |
| SFS | 0.05 |
| Chain Transfer Agent | Variable |
| Thiostop N | 0.4 |

[a]Charged as 50 wt. % aqueous solution.
[b]Soltrol ® 145 an isoparaffinic liquid hydrocarbon mixture available from Phillips Petroleum Company.
[c]Sorbitan monooleate from ICI Americas, Inc.
[d]Polyoxyethylene (20) sorbitan trioleate from ICI Americas, Inc.
[e]Polyoxyethylene (4) cetyl/stearyl alcohol from Alcolac, Inc.

In each run of this series all of the monomers were mixed with water and the mixture sparged with $N_2$. The emulsifiers were mixed with the hydrocarbon (Soltrol ®145) and this mixture also sparged with $N_2$. The above mixtures were then combined and chain transfer agent added with agitation. The reactor bottle then was pressured with 25 psig $N_2$ and cooled to 5° C. The initiator system was charged last to begin the polymerization reaction.

The resulting water-in-oil latexes comprising the water soluble polymer of VP/AM/AA/NaAMPS were analyzed for wt.% solids content and residual VP and AM content. In addition, a sample of each latex was mixed with Synthetic Ocean Water (SOW) to provide a 0.1 wt.% mixture of the polymer and SOW based on the combined weight of the polymer and SOW. Each mixture was shaken for at least 3 hours to assure dissolution of the polymer in the SOW before an inherent viscosity (I.V.) determination in dL/g was made at 25° C. The SOW was prepared from a commercially available salts mixture which can be used to prepare a brine which closely approximates the composition of naturally occurring ocean water. The results obtained in this series of runs are presented in Table I below.

TABLE I

| Run No. | Chain Transfer Agent Type | Amount, phe[a] | Solids Wt. %[b] | Inherent Viscosity 0.1% in SOW, dL/g |
|---|---|---|---|---|
| 1 | $C_{12}SH$[c] | 0.058 | —[h] | — |
| 2 | $C_{12}SH$[c] | 0.144 | 43.3 | 5.7 |
| 3 | $C_{12}SH$[c] | 0.576 | 44.1 | 5.0 |
| 4 | $C_9SH$[d] | 0.058 | 43.0 | 5.1 |
| 5 | $C_9SH$[d] | 0.144 | 43.9 | 4.2 |
| 6 | $C_9SH$[d] | 0.576 | 46.4 | 3.9 |
| 7 | 2-Propanol | 0.053 | 43.5 | 5.6 |
| 8 | 2-Propanol | 0.132 | 43.5 | 6.2 |
| 9 | 2-Propanol | 0.526 | 44.2 | 4.6 |
| 10 | None | 0 | 41.8 | 4.6 |
| 11 | BME[e] | 0.075 | 45.2 | 0.39 |
| 12 | BME[e] | 0.187 | 45.0 | 0.22 |
| 13 | BME[e] | 0.745 | 45.7 | 0.08 |
| 14 | TGA[f] | 0.088 | 44.2 | 0.79 |
| 15 | TGA[f] | 0.222 | 45.2 | 0.36 |
| 16 | TGA[f] | 0.884 | 45.7 | 0.16 |
| 17 | MMP[g] | 0.033 | 45.6 | 0.52 |
| 18 | MMP[g] | 0.132 | 44.6 | 0.26 |

TABLE I-continued

| Run No. | Chain Transfer Agent Type | Amount, phe[a] | Solids Wt. %[b] | Inherent Viscosity 0.1% in SOW, dL/g |
|---|---|---|---|---|
| 19 | MMP[g] | 0.334 | 45.9 | 0.10 |

[a] Parts by weight per 100 parts by weight of the water-in-oil emulsion (phe).
[b] Theoretical polymer content is 33.7 wt. % for 100% conversion of monomers to polymer. Values shown reflect emulsifiers present which are not volatile under the conditions used in the solids determination.
[c] Tert-Dodecyl mercaptan. Sulfole ® 120 from Phillips Chemical Co.
[d] Tert-Nonyl mercaptan. Sulfole ® 90 from Phillips Chemical Co.
[e] BME is 2-mercaptoethanol.
[f] TGA is mercaptoacetic acid.
[g] MMP is methyl 3-mercaptopropionate.
[h] This run failed to polymerize for reasons which are not known.

It can be seen that Run 10 is a control run which employed no chain transfer agent, while Runs 1–9 are comparative runs which employed other known chain transfer agents, which have been proposed for use in water-in-oil emulsion polymerization systems. Runs 11–19 were made with chain transfer agents employed according to my invention but at relatively high levels except for Runs 11, 14 and 17. At any rate, it is apparent that the I.V. results for Runs 11–19 show that the chain transfer agents employed therein were surprisingly much more efficient in reducing the I.V. of the polymer than the chain transfer agents of Runs 1–9.

EXAMPLE II

Another series of runs was carried out using the same recipe as that employed in Example I except that the amount of water was increased from 85 to 100 parts by weight. Various levels of 2-mercaptoethanol (BME) mercaptoacetic acid (TGA) and methyl 3-mercaptopropionate (MMP) were utilized in this series of runs. The 2-mercaptoethanol and mercaptoacetic acid were diluted with water (1 mL to 10 mL in $H_2O$) and the methyl 3-mercaptopropionate was diluted with Soltrol ® 145 (1 mL to 10 mL in Soltrol ® 145) for convenience in charging small amounts to the reaction mixture. The results obtained in this series of runs are shown in Table II.

TABLE II

| Run No. | Chain Transfer Agent Type | Amount, phe[a] | Solids Wt. %[b] | Inherent Viscosity 0.1% in SOW, dL/g |
|---|---|---|---|---|
| 20 | BME | 0.071 | 42.8 | 0.49 |
| 21 | BME | 0.018 | 43.0 | 1.32 |
| 22 | BME | 0.0099 | 43.6 | 1.81 |
| 23 | BME | 0.0064 | 42.4 | 2.20 |
| 24 | TGA | 0.085 | 42.5 | 1.09 |
| 25 | TGA | 0.056 | 44.3 | 1.32 |
| 26 | TGA | 0.0314 | 43.2 | 1.79 |
| 27 | TGA | 0.0247 | 43.3 | 2.00 |
| 28 | MMP | 0.070 | 43.0 | 0.58 |
| 29 | MMP | 0.0279 | 42.6 | 1.04 |
| 30 | MMP | 0.0160 | 42.7 | 1.33 |
| 31 | MMP | 0.0104 | 43.6 | 1.96 |
| 32 | None | 0 | 43.2 | 7.8 |

[a] See footnote (a) Table I.
[b] Theoretical polymer content is 32.1 wt. % for 100% conversion of monomers to polymer.

Run 32 is a control run which employed no chain transfer agent and gave an I.V. of 7.8 for the 0.1 wt.% solution in SOW. It can be seen that even at the lowest levels employed in this series of runs, BME, TGA and MMP were quite effective in reducing the I.V. value from 7.8 to about 2.

EXAMPLE III

Additional runs were conducted for the preparation of oil-in-water latexes of the water-soluble polymer prepared in Examples I and II above. In the runs of this series, another emulsifier system was employed and the initiator levels were cut in half from those used in Examples I and II. The recipe utilized for this series is shown below.

| RECIPE | Parts, by Weight |
|---|---|
| VP | 30 |
| AM[a] | 10 |
| AA | 5 |
| NaAMPS[a] | 55 |
| Water | 110 |
| Soltrol ® 145 | 90 |
| Emulsifier: | |
| Atmos 300[b] | 8 |
| G1096[c] | 12 |
| Initiator: | |
| PMHP | 0.024 |
| $FeSO_4 \cdot 7H_2O$ | 0.00002 |
| Questex 4SW | 0.00006 |
| SFS | 0.025 |
| Chain Transfer Agent (BME)[d] | Variable |
| Temperature, °C. | 5 |
| Time, hours | 24 |

[a] Charged as 50 wt. % aqueous solution.
[b] Mono- and diglycerides of fat forming fatty acids from ICI Americas, Inc.
[c] Polyoxyethylene (5) sorbitan hexaoleate from ICI Americas, Inc.
[d] Charged as an aqueous solution (1 mL BME to 10 mL in $H_2O$).

The results obtained in this series of runs are shown below in Table III.

TABLE III

| Run No. | BME Amount, phe[a] | Solids, Wt. %[b] | Inherent Viscosity 0.1% in SOW, dL/g |
|---|---|---|---|
| 33 | 0 | 38.3 | 7.2 |
| 34 | 0.0035 | 38.4 | 2.7 |
| 35 | 0.0087 | 38.2 | 1.7 |
| 36 | 0.0174 | 37.5 | 1.2 |

[a] See footnote (a) of Table I.
[b] Theoretical polymer content is 31.3 wt. % for 100% conversion of monomers to polymer.

Run 33 is a control run which employed no chain transfer agent and gave an I.V. value of 7.2. Even at very low levels, BME was quite effective in reducing the I.V. in Runs 34–36.

EXAMPLE IV

A further series of runs was made to prepare water-in-oil latexes of another type of water soluble polymer, i.e. a VP/AM (50/50) copolymer.

The recipe used in this series is shown below.

| RECIPE | Parts, by Weight |
|---|---|
| VP | 50 |
| AM[a] | 50 |
| Water | 80 |
| Soltrol ® 145 | 100 |
| Emulsifier: | |
| Atmos 300[b] | 10.2 |
| G1096[c] | 9.8 |
| Initiator: | |
| PMHP | 0.024 |
| $FeSO_4 \cdot 7H_2O$ | 0.00002 |
| Questex 4SW | 0.00006 |
| SFS | 0.025 |
| BME[d] | Variable |
| Temperature, °C. | 5 |

-continued

| RECIPE | |
|---|---|
| | Parts, by Weight |
| Time, hours | 24 |

(a)Charged as 50 wt. % aqueous solution.
(b)See recipe of Example III.
(c)See recipe of Example III.
(d)Charged as an aqueous solution (1 mL BME to 10 mL in H$_2$O).

The results shown in Table IV were obtained in this series of runs.

TABLE IV

| Run No. | BME Amount phe(a) | Solids, Wt %(b) | Inherent Viscosity 0.1% in SOW, dL/g |
|---|---|---|---|
| 37 | 0 | 40.2 | 7.9 |
| 38 | 0.0037 | 39.5 | 3.5 |
| 39 | 0.0093 | 39.5 | 2.2 |
| 40 | 0.0186 | 39.5 | 1.5 |

(a)See footnote (a) of Table I.
(b)Theoretical polymer content is 33.3 wt. % for 100% conversion of monomers to polymer.

Run 37 is a control run which employed no chain transfer agent and gave an I.V. value of 7.9. Again, even at very low levels, BME was quite effective in reducing the I.V. in Runs 38-40 for a VP/AM (50/50) copolymer made in a water-in-oil emulsion polymerization system.

EXAMPLE V

Still another series of runs was carried out for the preparation of another type of water-soluble polymer in the form of water-in-oil latexes. The polymer made in this series was a VP/AM/NaAMPS (30/15/55) terpolymer. The recipe employed in this series is shown below.

| RECIPE | |
|---|---|
| | Parts, by Weight |
| VP | 30 |
| AM(a) | 15 |
| NaAMPS(a) | 55 |
| Water | 90 |
| Soltrol ® 145 | 100 |
| Emulsifier: | |
| Atmos 300(b) | 10.2 |
| G1096(c) | 9.8 |
| Initiator: | |
| PMPH | 0.024 |
| FeSO$_4$.7H$_2$O | 0.00002 |
| Questex 4SW | 0.00006 |
| SFS | 0.025 |
| BME(d) | Variable |
| Temperature, °C. | 5 |
| Time, hours | 24 |

(a)Charged as 50 wt. % aqueous solution.
(b)See recipe of Example III.
(c)See recipe of Example III.
(d)Charged as an aqueous solution (1 mL BME to 10 mL in H$_2$O).

The results obtained in this series of runs are presented in Table V below.

TABLE V

| Run No. | BME Amount phe(a) | Solids, Wt. %(b) | Inherent Viscosity 0.1% in SOW, dL/g |
|---|---|---|---|
| 41 | 0 | 38.2 | 7.3 |
| 42 | 0.0036 | 38.7 | 3.1 |
| 43 | 0.0090 | 40.7 | 2.0 |

TABLE V-continued

| Run No. | BME Amount phe(a) | Solids, Wt. %(b) | Inherent Viscosity 0.1% in SOW, dL/g |
|---|---|---|---|
| 44 | 0.0180 | 39.9 | 1.5 |

(a)See footnote (a) of Table I.
(b)Theoretical polymer content is 32.3 wt. % for 100% conversion of monomers to polymer.

Run 41 is a control run which utilized no chain transfer agent and which gave an I.V. value of 7.3. The results for Runs 42-44 again demonstrate that, even at very low levels, BME is very effective in reducing the I.V. value for the VP/AM/NaAMPS (30/15/55) terpolymer prepared in a water-in-oil emulsion polymerization system.

EXAMPLE VI

Further runs were made using the recipe and procedures of Example III except that other levels of 2-mercaptoethanol (BME) chain transfer agent were employed. The results obtained in this series of runs are shown in Table VI below.

TABLE VI

| Run No. | BME Amount phe(a) | Solids, Wt. %(b) | Inherent Viscosity 0.1% in SOW, dL/g |
|---|---|---|---|
| 45 | 0.0157 | 37.9 | 1.2 |
| 46 | 0.0157 | 37.6 | 1.2 |
| 47 | 0.0209 | 38.1 | 1.0 |
| 48 | 0.0209 | 37.8 | 1.0 |

(a)See footnote (a) of Table I.
(b)Theoretical polymer content is 31.3 wt. % for 100% conversion of monomers to polymer.

The results in Table VI show that low I.V. values for the VP/AM/AA/NaAMPS (30/10/5/55) copolymer are readily obtained at relatively low levels of 2-mercaptoethanol (BME) chain transfer agent. Excellent reproducibility is also seen for these runs since Runs 45 and 46 and 47 and 48 are duplicate pairs of runs.

That which is claimed is:

1. A polymerization process comprising:
   (a) admixing at least one ethylenically unsaturated monomer, water, at least one organic liquid which is substantially immiscible with water, at least one water-in-oil emulsifier, at least one polymerization initiator, and at least one thiol having the formula HS-Y(Z)$_x$ wherein Y is a hydrocarbyl radical having 2-5 carbon atoms and a valence of x+1; Z is selected from the group consisting of —OH, —CO$_2$H and —CO$_2$R wherein R is an alkyl radical of 1-3 carbon atoms; x is an integer of 1 or 2; and wherein the total number of carbon atoms per molecule of said thiol is 2-7 to form an admixture wherein the amount of said thiol present in said admixture is about 0.00007 to about 0.07 parts by weight of said thiol per 100 parts by weight of said admixture; and
   (b) subjecting said admixture to polymerization conditions sufficient to produce a water-in-oil latex comprising a water-soluble polymer of said at least one ethylenically unsaturated monomer.

2. A process according to claim 1 wherein the amount of said thiol present in said admixture is about 0.00013 to about 0.03 parts by weight of said thiol per 100 parts by weight of said admixture.

3. A process according to claim 1 wherein said monomer is selected from the group consisting of acrylamide, methacrylamide, N-vinyl-2-pyrrolidone, acrylic acid, methacrylic acid, 2-acrylamido-2-methylpropanesulfonic acid, salts of acrylic acid, salts of methacrylic acid, salts of 2-acrylamido-2-methylpropanesulfonic acid, and mixtures thereof.

4. A process according to claim 3 wherein said organic liquid which is substantially immiscible with water is selected from the group consisting of liquid hydrocarbons.

5. A process according to claim 4 wherein said polymerization initiator comprises a free radical producing compound selected from the group consisting of azo compounds, organic peroxides, organic hydroperoxides, and inorganic persulfates.

6. A process according to claim 5 wherein said water-in-oil emulsifier has an HLB number of about 3 to about 9.

7. A process according to claim 6 wherein said water-in-oil emulsifier is present in said admixture in an amount of about 1 to about 15 weight percent based on the total weight of said admixture.

8. A process according to claim 7 wherein said liquid hydrocarbon is present in said admixture in an amount of about 60 to about 120 parts by weight per 100 parts by weight of monomer(s) and wherein said polymerization conditions comprise a temperature of about $-20°$ to about 200° C. and a time of about 0.5 to about 72 hours.

9. A process according to claim 8 wherein said monomer comprises a mixture of N-vinyl-2-pyrrolidone, acrylamide, acrylic acid and the sodium salt of 2-acrylamido-2-methylpropanesulfonic acid.

10. A process according to claim 9 wherein the weight ratio of N-vinyl-2-pyrrolidone to acrylamide to acrylic acid to the sodium salt of 2-acrylamido-2-methylpropanesulfonic acid in said mixture is 30/10/5/55 per 100 parts by weight of said mixture.

11. A process according to claim 10 wherein said free radical producing compound comprises p-menthane hydroperoxide.

12. A process according to claim 1 wherein Z is $-OH$.

13. A process according to claim 1 wherein Z is $-CO_2H$.

14. A process according to claim 1 wherein Z is $-CO_2R$.

15. A process according to claim 12 wherein said thiol is selected from the group consisting of 2-mercaptoethanol, 3-mercapto-1-propanol, and 3-mercapto-1,2-propanediol.

16. A process according to claim 13 wherein said thiol is selected from the group consisting of mercaptoacetic acid, 3-mercaptopropionic acid and mercaptosuccinic acid.

17. A process according to claim 14 wherein said thiol is selected from the group consisting of methyl 3-mercaptopropionate, propyl mercaptoacetate, ethyl mercaptoacetate, methyl mercaptoacetate and dimethyl 2-mercaptomalonate.

* * * * *